(12) United States Patent
Metz (10) Patent No.: US 12,081,563 B2
(45) Date of Patent: Sep. 3, 2024

(54) AUTONOMOUS NETWORK SECURITY SCALING

(71) Applicant: Level 3 Communications, LLC, Broomfield, CO (US)

(72) Inventor: Bobby W. Metz, Gilbert, AZ (US)

(73) Assignee: Level 3 Communications, LLC, Denver, CO (US)

( * ) Notice: Subject to any disclaimer, the term of this patent is extended or adjusted under 35 U.S.C. 154(b) by 365 days.

(21) Appl. No.: 17/510,713

(22) Filed: Oct. 26, 2021

(65) Prior Publication Data

US 2022/0131880 A1 Apr. 28, 2022

Related U.S. Application Data

(60) Provisional application No. 63/106,157, filed on Oct. 27, 2020.

(51) Int. Cl.
*H04L 67/148* (2022.01)
*H04L 9/40* (2022.01)

(52) U.S. Cl.
CPC ........ *H04L 63/1416* (2013.01); *H04L 63/029* (2013.01); *H04L 63/1425* (2013.01); *H04L 63/20* (2013.01); *H04L 67/148* (2013.01)

(58) Field of Classification Search
CPC .............. H04L 63/1416; H04L 63/029; H04L 63/1425; H04L 63/20
See application file for complete search history.

(56) References Cited

U.S. PATENT DOCUMENTS

| | | | |
|---|---|---|---|
| 8,612,612 B1 * | 12/2013 | Dukes | H04L 67/141 709/203 |
| 11,595,576 B2 * | 2/2023 | Elizov | H04N 23/667 |
| 11,601,356 B2 * | 3/2023 | Gandhi | H04L 45/50 |
| 11,606,286 B2 * | 3/2023 | Michael | H04L 45/24 |
| 11,700,196 B2 * | 7/2023 | Michael | H04L 45/64 370/252 |
| 11,706,127 B2 * | 7/2023 | Michael | H04L 45/745 370/252 |
| 11,770,398 B1 * | 9/2023 | Erlingsson | G06F 16/986 709/224 |

(Continued)

FOREIGN PATENT DOCUMENTS

CA 2951944 C * 6/2020 ......... H04L 12/4633

*Primary Examiner* — Khanh Q Dinh (57) ABSTRACT

Apparatus, systems, methods, and the like, for autonomous scaling of security and other network services through initialization of a service from a network service device and/or migration of such services from one service device to another is provided. Such network scaling may allow for migration of services from existing service edges to other service edges. A security management system may coordinate the migration of services provided to a secondary network from one or more service edges to another, separate service edge while providing session synchronization during the migration. To migrate the services from the first service edge to a second service edge, a session table may be shared between the service edges and the first and second service edges may advertise service routes or endpoints with one or more priority values to control or otherwise determine which service edge is selected by a service-receiving device to receive the services.

16 Claims, 6 Drawing Sheets

(56) References Cited

U.S. PATENT DOCUMENTS

| | | | |
|---|---|---|---|
| 11,792,284 B1* | 10/2023 | Nanduri | H04L 41/046 |
| | | | 709/224 |
| 11,895,194 B2* | 2/2024 | Markuze | H04L 67/10 |
| 11,902,086 B2* | 2/2024 | Mayya | H04L 12/66 |
| 2019/0158606 A1* | 5/2019 | Guim Bernat | H04W 40/20 |
| 2020/0177550 A1* | 6/2020 | Valluri | H04L 63/0236 |

* cited by examiner

AUTONOMOUS NETWORK SECURITY SCALING

CROSS-REFERENCE TO RELATED APPLICATION

This application is related to and claims priority under 35 U.S.C. § 119(e) from U.S. Patent Application No. 63/106,157, filed Oct. 27, 2020 entitled "AUTONOMOUS NETWORK SECURITY SCALING," the entire contents of which is incorporated herein by reference for all purposes.

TECHNICAL FIELD

Embodiments of the present invention generally relate to systems and methods for managing services from a communications network, and more specifically for autonomous scaling of security services provided by a communications network.

BACKGROUND

Providing secure communications between devices is an important objective of many communication networks. Many communication network configurations therefore include one or more services to provide security to the network devices and/or devices utilizing the network to communicate. For example, a network may include a firewall service that controls or monitors incoming and outgoing traffic to/from another network, network device, or other device. Firewall devices are typically functionally positioned at entry points of a network such that potentially harmful or malicious communications can be detected and acted on by the firewall such as through quarantining, blocking, discarding etc. The firewall acts as a first line of defense against potentially malicious traffic by keeping unauthorized information from entering the network and authorized information to flow into and out of the network. Other security devices, systems, and/or services may respond to denial-of-service attacks, phishing schemes to obtain sensitive information, malware distribution in or on the network, and the like. Through a variety of security procedures and devices, a network may be situated to respond to attacks and protect the communications within and transmitted through/from the network.

In addition, customer networks and devices may connect to a large network, such as those providing backbone, Internet services, and other services in many locations or via separate gateway devices. However, security services provided by a network may be more difficult to scale to the various ingresses into the network. For example, a customer network or device may communicate with a backbone network via multiple gateway devices in multiple locations to receive security services from the network. For business or technical reasons, the customer may desire to consolidate security services to one network access point or move the security services to other network access points. However, migration or scaling of such network services is often labor intensive for network technicians and often result in some disruption to the security service and other services, such as Internet connections, voice connections, etc., offered to the customer network. The time needed to transfer security services from one access point to another, the labor involved, and the disruptions to the services provided by the network make current scaling of network security services undesirable to many network operators.

It is with these observations in mind, among other, that aspects of the present disclosure were conceived.

SUMMARY

One aspect of the present disclosure relates to a method for managing services provided by a telecommunications network. The method may include the operations of establishing a session table of a first service edge at a second service edge of a network, the session table comprising communication information between the first service edge and a receiving device in communication with the first service edge, establishing a security service from the first service edge at the second service edge, the security service associated with the communication information of the session table, and, responsive to establishing the session table at the second service edge, providing the security service to the receiving device from the second service edge.

Another aspect of the present disclosure relates to a device comprising a processing device and a non-transitory computer-readable medium encoded with instructions. The instructions may be executed by the processing device, which cause the processing device to copy a session table of a first service edge at a second service edge of a service network, the session table comprising communication information between the first service edge and a receiving device connected to the first service edge, migrate an instance of a security service from the first service edge to the second service edge, the security service associated with the communication information of the session table, and, responsive to the migration of the instance of the security service, provide a security feature to the receiving device from the second service edge.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Aspects of the present disclosure involve an apparatus, systems, methods, and the like, for autonomous scaling of security and other network services through initialization of a service from a network service device and/or migration of such services from one service device to another. Such network scaling may allow for migration of services from existing metro clusters (or service edges) to geographically dispersed service edges. In one particular instance, a security management system may coordinate the migration of services provided to a secondary network or device from one or more service edges to another, separate service edge while providing session synchronization during the migration. In some instances, migration may occur in response to a request from a device or in response to a network operational condition, such as traffic monitoring at one or more of the services edges or a disruption at a service edge. Through the security management system, changes to the security services provided by a network may be autonomously managed or altered with minimal network administrator interaction to improve the operational efficiency of network security services.

As mentioned, the migration of services from one service edge to a different service edge may occur while maintaining already established communication sessions. For example, security services provided by a first service edge may include one or more communication sessions with a secondary network or device. To migrate the services from the first service edge to a second service edge, a session table may be shared between the service edges such that the second service edge may take over control of the communication sessions without termination or restarting of ongoing sessions. Further, in some instances the first and second service edges may advertise service routes or endpoints with one or more priority values to control or otherwise determine which service edge is selected by a service-receiving device to receive the services. Through control of the priority values advertised by the service edges, a seamless migration of service sessions from the first service edge to the second service edge may occur, while maintaining established communication sessions during the migration, thereby reducing any impact to the secondary network in response to the network changes.

Figure 1:
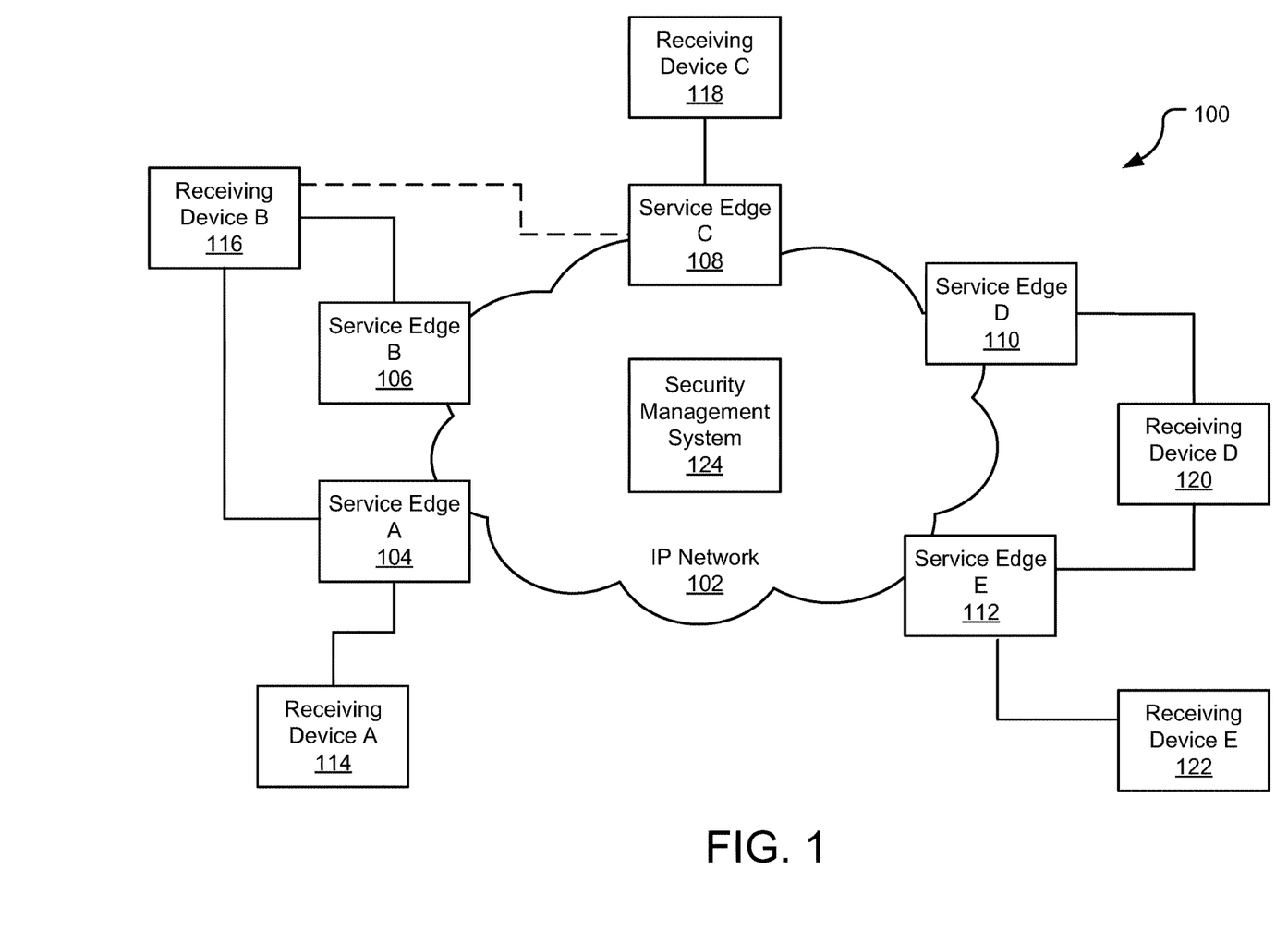
FIG. 1 schematic diagram illustrating an exemplary network operating environment in accordance with one embodiment.

FIG. 1 illustrates an exemplary operating environment 100 for a communications network to provide security services for one or more secondary networks, which may include service receiving devices A-E 114-122. Although labeled in FIG. 1 as receiving devices A-E 114-122, it should be appreciated that the receiving devices may include any number and type of computing devices of a network and not necessarily one receiving device. In general, the environment 100 provides communication, network, and/or or information services for receiving devices (also known as network user devices or customer devices). For example, receiving devices may connect to or otherwise communicate with the network 102 to access or transmit information and/or conduct voice or video communication using communication devices such as various user type computing devices like tablets, laptops, IP based telephony devices, and mobile communication devices. In another example, the environment may be or may be connected with a content delivery network (CDN) to serve content to receiving devices. In still another example, the network environment 100 may facilitate communications between networks managed or administered by separate entities, such as communications between IP network 102 and receiving devices 114-122. With specific reference to FIG. 1, the environment 100 includes an IP network 102, which may be provided by a wholesale network service provider. However, while the environment 100 of FIG. 1 shows a configuration using the IP network 102, it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, route reflectors, and registrars, which enable communication and/or provides services across the IP network 102, but are not shown or described in detail here because those skilled in the art will readily understand these components. Communications between the IP network 102 and other entities or networks, such as the one or more receiving devices 114-122 or secondary networks, may also be managed through network environment 100. In some instances, receiving devices 114-122 may be devices and/or networks associated with a home network and can include personal communication devices such as, but not limited to, a personal computer or a mobile cellular telephone in communication with a router/firewall. In other instances, receiving devices 114-122 may include devices and/or networks of larger-scale networks, such as virtual private networks (VPNs) or enterprise networks, which may connect to the network 102 in various geographic locations. In general, the receiving devices 114-122 may include any type of communication device that receives a communication signal, such as an audio, video, or web-based signal, and presents that signal for use by a user of the communication device. The communication and networking components of the secondary networks enable a user at the secondary network to communicate via the IP network 102 with other communication devices, such as another secondary network and/or the Internet. Components of the secondary networks are typically home- or business-based, but they can be relocated and may be designed for easy portability. For example, the communication device may be wireless (e.g., cellular) telephone, smart phone, tablet, or portable laptop computer. In some embodiments, multiple communication devices in diverse locations that are owned or operated by a particular entity may be connected through the IP network 102.

Receiving devices 114-122 may connect to, or otherwise communicate with, IP network 102 through one or more network interface devices or edge devices 104-112, such as provider edge devices and/or media gateway devices. Edge devices 104-112 may be located in a network edge site with multiple network devices configured to provide network services to connected receiving devices. For example, service edge A 104 may be a network site including multiple computing devices for interfacing with network 102 to provide multiple network services, such as a security service, Internet access, storage capabilities, and the like to receiving device A 114. For ease of instruction, only five receiving devices 114-122 are shown communicating with the IP network 102 via five service edges 104-112; however, numerous such networks, and other devices, may be connected with the network 102 via numerous service edges. As such, the network 102 and edge devices 104-112 may be equipped to handle enormous numbers of simultaneous calls and/or other IP-based communications. Further, although referred to herein as "secondary networks" and/or "receiving devices", such networks and/or devices may not be necessarily be a customer of the network 102. Rather, secondary networks and/or receiving devices may refer to any device in communication with IP network 102.

The network 102 may provide an interface to the receiving devices 114-122 via the service edges 104-112 such that communications transmitted from and intended for the receiving devices may be provided via the IP network 102.

Similarly, communications from the receiving devices 114-122 to a device of the network 102 or to a device accessible from the network 102 may also be received at the network and routed according to a destination device identifier. The IP network 102 may also provide one or more telecommunication or other network services to the receiving devices 114-122. For example, a customer to the network may purchase, and the IP network 102 may provide, one or more security services for protection of the communications to and from the receiving devices 114-122. Such security services may be provided via one or more service edges 104-112 connected to or otherwise in communication with the receiving devices 114-122. For example, receiving device A 114 may receive security or other network services from service edge A 104. As mentioned above, service edge A 104 may be a device or a collection of devices and is typically located in a geographic area, such as a metro area, such that receiving device A 114 connects to the network 102 via the service edge A 104 in that geographic location. Service edges 104-112 may also provide services to more than one receiving device 114-122. For example, service edge A 104 may also provide security or other network services to receiving device B 116. Receiving devices 114-122 may also receive such network services from multiple service edges and, in some instances, in various geographic locations. For example, receiving device B 116 may be a large area network that has access points in various locations. To receive services from the network 102, receiving device B 116 may connect to service edge A 104 in a first location and to service edge B 106 in second location. The first location and the second location may be geographically diverse or logically diverse from each other. The services provided by the services edges 104, 106 may be the same services or different services. Also illustrated in the example environment 100 of FIG. 1 is receiving device C 118 receiving services from service edge C 108, receiving device D 120 receiving network services from both service edge D 110 and service edge E 112, and receiving device E 122 receiving services from service edge E 112. Each of the receiving devices 114-122 and service edges 104-112 may be in a different geographic location to provide flexibility of access points to the receiving devices when connected to and receiving services provided by the network.

In some instances, the network 102 may include a security management system 124 or orchestrator for managing the provision of security services of receiving devices 114-122 to the network via the service edges 104-112. In general, the security management system 124 may receive requests for security services from the receiving devices 114-122 and provision the service edges 104-112 to provide the requested services. Changes in the provided services may also be controlled by the security management system 124, such as migration of services from one service edge 104-112 to another or other security network scaling operations. To provision the services or control scaling of the security services, the security management system 124 may generate and transmit one or more instructions or commands to service edges 104-112 to cause devices at the service edges to be configured for requested services. Several operations described below to manage or scale the network security may be executed or performed by the security management system 124 in response to a request to alter a provided service to a receiving device.

For any number of reasons, services provided by the network 102 may be migrated from one service edge 104-112 to another or may begin to be provided to a new or existing receiving device from a previously unconnected service edge. For example, receiving device B 116 may request additional services from the network 102 via service edge C 108, as indicated by the dotted line in FIG. 1. In another example, receiving device B 116 may request to migrate such services to service edge C 108 and begin receiving the services directly from service edge C and not service edge B. In one instance, receiving device B 116 may migrate services to service edge C 108 in response to network demands, such as location of a headquarters associated with receiving device B 116 in the same or near the geographic location of service edge C 108. Regardless of the reason for migration of services or additional of new services, providing services from service edge C 108 to receiving device B 116 may include many operations to perform with potential loss of traffic during the migration.

Figure 2:
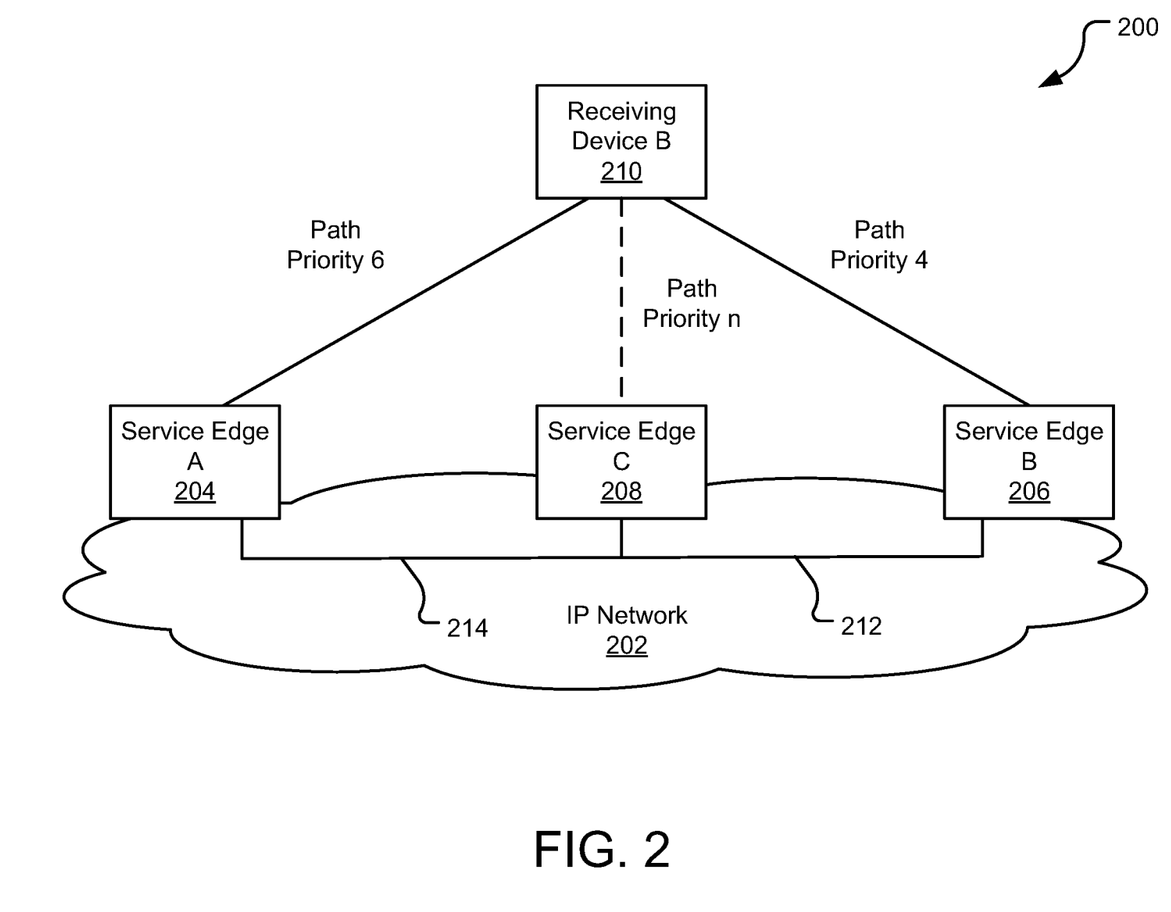
FIG. 2 is a schematic diagram illustrating a network environment for migration of network security services from a first device to a second device in accordance with one embodiment.

To provide a safe and secure transfer or new instantiation of services, a system and method are provided herein for migration, addition, or other scaling of services providing by a network 102 to receiving device s 114-122 of the network. An example network environment 200 for migration of network security services from a first device to a second device in accordance with one embodiment is illustrated in FIG. 2. Many of the components of the network environment 200 of FIG. 2 are the same or similar to that described above. For example, a network 202 is illustrated for providing one or more services to receiving devices via one or more service edges. In the example shown, receiving device B 210 connects to service edge A 204 and service edge B 206 to receive network services from network 102. Such services may include, but are not limited to, a firewall service or device to provide gatekeeping functions for communications into or out of the network 102 to/from receiving device B 210. In one example, the firewall service may be included in the provider edge device of the IP network 102 that receives communications associated with the secondary network, represented by receiving device B 210. The firewall service may block, re-route, deny, flag, etc. communications entering or leaving the receiving device B 210 based on a set of firewall rules. The IP network 202 may also provide other security services to the receiving device B 210. For example, the IP network 202 may provide a secure Domain Name Server (DNS) to the receiving device B 210. The secure DNS service may operate as a typical DNS device by receiving requests for IP addresses associated with a domain name. The secure DNS service, however, may provide security in the response to the DNS request by blocking the return of IP addresses for particular domain names, responding with a security alert for particular domain names, redirecting devices to an IP address for domain names, and the like. Another security service provided by the IP network 202 may be an adaptive network security (ANS) service. The ANS service may include a combination of security features provided as a package of services offered by the IP network 202, including firewall protection and/or secure DNS services. In general, the IP network 202 may provide any number and types of security services to receiving devices of the network. Other, non-security services may also be provided, such as Internet access, long distance communications, wireless services, and the like.

As mentioned above, service edge A 204 may be located in or otherwise associated with a first location and service edge B 206 may be located in or otherwise associated with a second location. The different locations of the service edges may be geographically distinct or within the same gateway of data center of the network 202. Network 202 may provide for communications between service edge A 204 and service edge B 206 via the network. Receiving device B 210 may therefore receive the services from service edge A 204 and service edge B 206 and coordinate aspects of such services via network 202. However, for any number of reasons, receiving device B 210 may request migration of some or all of the services provided by service edge B 206 and/or service edge A 204 to a third service edge (service edge C 208 in FIG. 2) in yet a third location or third access point to IP network 202. In one implementation, receiving device B 210 may notify an administrator of the IP network 202 to request the migration of services to service edge C 208. In another implementation, receiving device B 210 may access a device associated with network 202 and request the migration of the service through the device. In still another instance, the migration of services from one service edge to another may be initiated by the network 202, a network administrator, or a device or system of the network 202 to improve the operational efficiency of the network. Regardless, one or more components of the network 202 may automatically, in response to the request to migrate services from one service edge to another, execute one or more operations or methods to begin providing network services, such as network security services, to receiving device B 210 from service edge C 208. Further, such migration or scaling of the network services may occur without a disruption or disconnection of services or communications already being provided to receiving device B 210. In this manner, the network security services may be scaled or adjusted autonomously with limited negative impact on customers to the network 202.

Figure 3A:
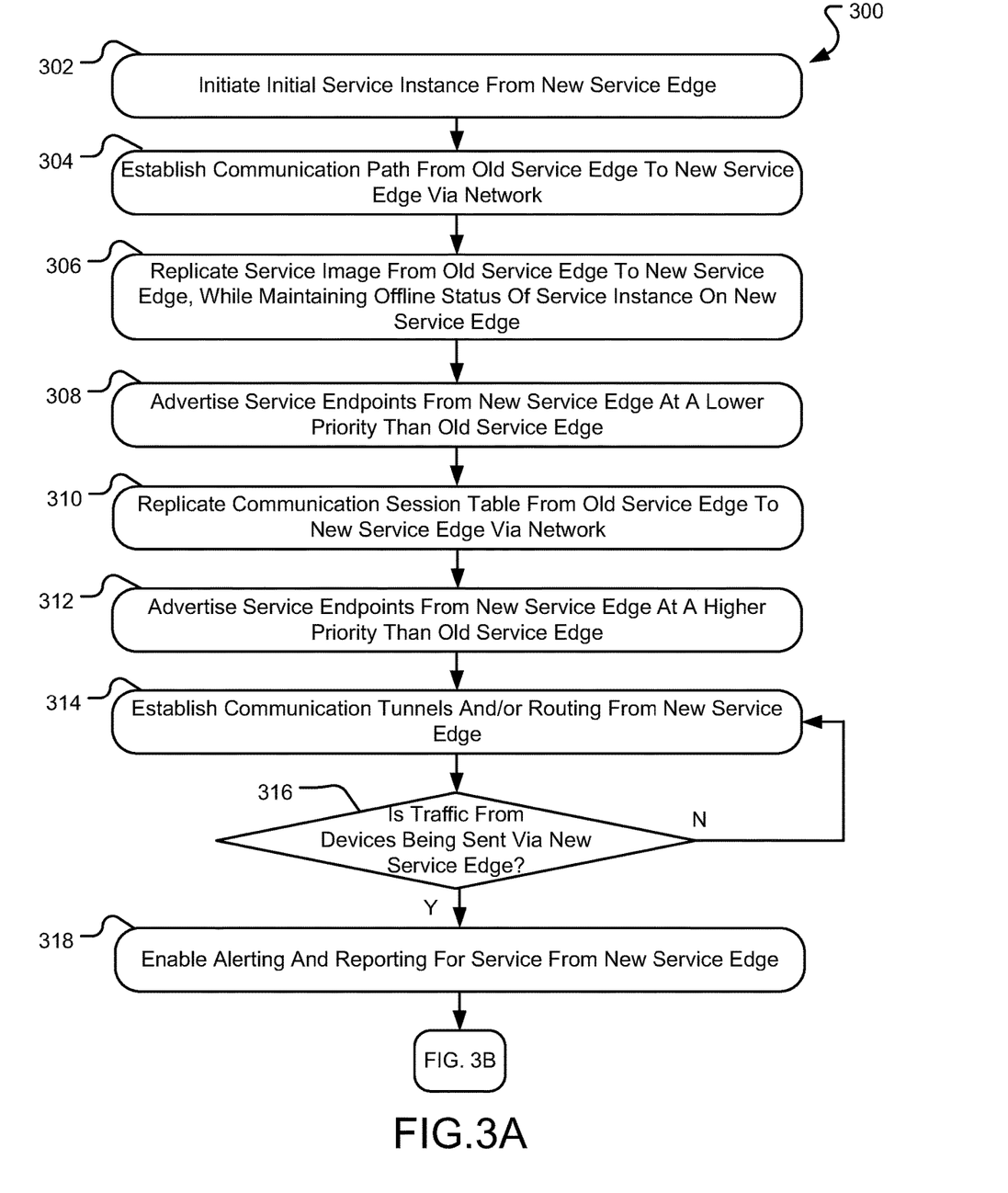
FIGS. 3A-3B Illustrate a flowchart of a method for migration of network security services from a first device to a second device in accordance with one embodiment.
Figure 3B:
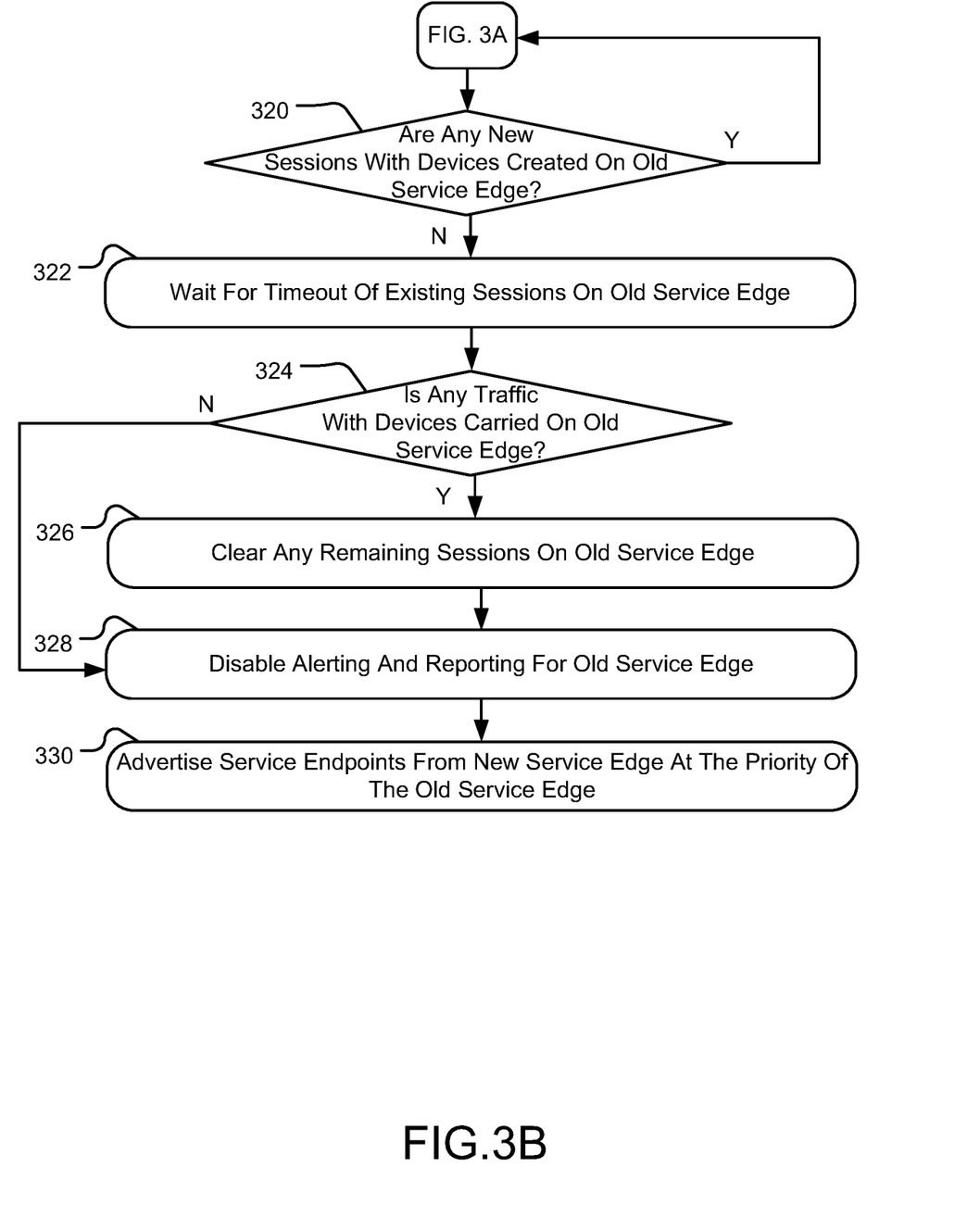

FIGS. 3A-3B Illustrate a flowchart of a method 300 for migration of network security services from a first device to a second device in accordance with one embodiment. In general, the operations of the method 300 may be performed or executed by devices and/or systems of the network 202 or associated with the network discussed above. In one particular example, the operations may be executed or controlled, via instructions or commands to devices of the services edges 204-208, by the security management system 124 described above. The operations may be performed by one or more hardware components of said devices, the execution of one or more software instructions, or a combination of both hardware components and software components. In general, any number and type of components of the network 202, including portions or devices of the service edges 204-206, may perform one or more of the operations of the method 300.

In some instances, receiving device B 210 may provide a request to an administrator, a provisioning system, or the like of the network 202 to migrate services from service edge B 206 and/or service edge A 204 to service edge C 208. For example, security management system 124 may receive the request from receiving device B 210 or other receiving devices connected to the network 102. In another example, security management system 124 may receive the request from an administrator system of the network 102 in response to a request from a customer or device to the network 102. In another instance, the network 202 may determine, based on analysis of traffic flow and/or network footprint or configurations, to migrate services provided to receiving device B 210 from service edge B 206 and/or service edge A 204 to service edge C 208. Regardless of the reason, components of the network may begin migration of services to service edge C 208 by initiating a basic or initial service instance on service edge C in operation 302. The initial service instance may include a baseline service program or configuration on devices of service edge C 208 that may not be configured to provide the requested service to receiving device B 210, but may instead support a service image associated with the requested service. In one instance, the baseline service image may correlate to a security service, such as a firewall service provided by the network 202.

In operation 304, the network 202 may establish a communication link 212 between service edge B 206 and service edge C 208. As explained in more detail below, the communication link 212 may be utilized to transmit information through the network 102 between service edge B 206 and service edge C 208 in support of the migration of services, such as a service image, service information, communication session information, and the like. The network 202 may then replicate the service image stored or instantiated in service edge B 206 onto the initial service instance of service edge C 208 in operation 306. The service image may, in some instances, include particular configurations for the service corresponding to receiving device B 210. For example, the service image may include communication protocols for communicating with receiving device B 210, one or more settings for the service (such as a security priority value), secondary network identifiers, etc. In the example in which the provided service is a firewall service, the service image may include a firewall table of processing rules, including a white list of allowed source/destination Internet Protocol (IP) addresses and/or a black list of banned source/destination IP addresses. In general, any configuration, data, identifiers, and the like corresponding to a service being provided to receiving device B 210 from service edge B 206 may be included in the service image replicated onto service edge C 208. The service image may be transmitted across connection 212 from service edge B 206 to service edge C 208. In particular, the network 202 may instruct service edge B 206 or some device of service edge B to transmit the service image to service edge C 208. In another instance, an indirect transfer of the service image may be performed. For example, connection 212 from service edge B 206 to service edge C 208 may be deemed inefficient, unreliable, or otherwise undesirable for the transfer of the service image from service edge B to service edge C. In such circumstances, the security management system 124, a provisioning system, or the like of the network 202 may be used to indirectly transfer the service image from service edge B 206 to service edge C 208 through another path between the services edges. For example, service edge B 206 may transfer the service image to service edge C 208 through another network, other devices of network 202, or any other communication path between the two service edges. Such indirect routes may include any number of intermediate devices or networks for transmitting the service image. Further, the transfer of the service image may occur regardless of an instruction from the network 202. For example, the service edge B 206 may determine the service image is to be transferred and facilitate the transmission, without first receiving an instruction to do so. Although the service image may be replicated to service edge C 208, the service may not be initially activated such that receiving device B 210 may continue to receive the service from service edge B 206.

In operation 308, the network 202 may instruct service edge C 208 (or more particularly, devices of service edge C) to advertise service endpoints to receiving device B 210. In general, service devices may advertise routes to one or more receiving devices over which the receiving devices may communicate with the service edges to receive services. For example, service edge B 206 may advertise one or more IP addresses of corresponding devices of the service edge to receiving device B 210. The devices of receiving device B 210 may receive the announced IP addresses from service edge B 206 and store the IP addresses as identifiers of addresses of devices providing a particular service. In this manner, receiving device B 210 may determine which devices and/or edges of the network 202 from which particular services may be received. Communication packets associated with those services may also be transmitted and/or exchanged between service edge B 206 and receiving device B 210 utilizing the announced service endpoints. In a similar manner, devices of receiving device B 210 may also announce address information to service edge B 206 such that the devices of service edge B may receive communications from the receiving device.

In some instances, the announced routes from service edge B 206 may include a priority value. In many instances, a route priority value is utilized by a networking device to select between multiple available routes or services. For example, receiving device B 210 may receive service from the network 202 via service edge B 206 and service edge A 204. Preference for one service edge over the other to receive the service from the network 202 may be established by a priority value associated with the advertised routes. For example, service routes advertised by service edge B 206 may have a priority value of 4, while service routes (for the same or other services) advertised from service edge A 204 may have a priority value of 6. Receiving device B 210 may store the priority values and associated IP addresses and be configured to select between the advertised service-providing devices based on the priority value. In one instance, a higher priority value associated with an advertised device may indicate the preferred device or route for the receiving device 210 to receive the service and otherwise communicate with the service edges. In the example illustrated in FIG. 2, receiving device B 210 may therefore receive the requested service via service edge A 204 instead of service edge B 206 as the advertised routes from service edge A have a higher priority value (6) than the priority value (4) of the routes advertised by service edge B 206. In this example, receiving device B 210 may select to receive the service from service edge B 206 as a back-up route when service from service edge A 204 may be interrupted, such as during a failure or high volume at service edge A 204. In this manner, the priority value associated with an advertised route or device may be used to control which path service packets and communications are transmitted.

Returning to the method 300 of FIG. 3A, the service endpoints advertised by service edge C 208 in operation 308 may include a priority value. This priority value for the advertised routes to the service edge 208 may be lower than the priority value associated with advertised service endpoints from service edge B 206 or other service edge from which the service is being migrated. For example, the priority value for the service endpoints of service edge B 206 may be 4 such that service edge C 208 may advertise service endpoints to receiving device B 210 with a priority value of 3 or less. The use of the lower priority value for the announced routes from service edge C 208 may ensure that receiving device B 210 continues to select service edge B 206 to receive the service packets during the migration process, but may also ensure that service routes will transfer automatically to service edge C 208 if an issue were to occur with service edge B 206 during migration. In this manner, the replicated service image on service edge C 208 may become the de facto back-up service edge for providing the service to receiving device B 210. However, one or more communication sessions may already be established between receiving device B 210 and service edge B 206 based on the higher priority route announced by service edge B. Transfer of communications from one route to another during a session may result in the session being prematurely ended or dropped. Thus, full migration of the service from service edge B 206 to service edge C 208 may not yet occur to ensure that current communication sessions are not severed by the migration.

In operation 310, the network 202 may instruct service edge B 206 to transmit a session table associated with the communications received from receiving device B 210 to service edge C 208. In general, service edge B 206 may create a session table that comprises one or more entries for each communication session established between the service edge and receiving device B 210. Such session table may include information pertinent to the communication, such as source address, destination address, source port information, destination port information, service port information, and the like. The service edge 206 may use the information to route received communication packets from receiving device B 210 that are associated with a provided service. For example, a communication packet may be received at service edge B 206 with a source address and, based on the information stored in the session table, service edge B may determine a destination address, a destination port, or a service port to utilize to transmit the received packet. In this manner (and others), the session table maintained by service edge B 206 may aid the service edge in providing services from the network 202. Upon completion of a communication session, the service edge 206 may remove the entry from the table corresponding to the session such that the table provides an indication of all current communication sessions with receiving device B 210. In some instances, each entry in the session table may be associated with a timer and, at the expiration of the timer, the entry is removed from the session table. The timer may be refreshed at various times during the communication session but may be allowed to expire when the session has completed, upon which the entry may be removed from the session table.

Service edge B 206 may transmit the copy of the session table to service edge C 208, which may be achieved via direct communication link 212 or other indirect communication links, and service edge C may store the session table and utilize the stored table to determine processing operations for received communications from receiving device B 210. To begin receiving communications from receiving device B 210 and take over the routing of the packets of the communication sessions, service edge C 208 may advertise, in operation 312, the service endpoint routes with a higher priority value than the priority value advertised by service edge B 206. For example and as mentioned above, a priority level of 4 may be associated with routes advertised or announced by service edge B 206. Thus, service edge C 208 may announce or advertise routes to service endpoints with a higher priority value than those routes of service edge B 206, or greater than 4. In one instance, the priority value for advertised routes may be 5, although any priority value greater than that of the routes announced by service edge B 206 may be used.

Upon receipt of the advertised routes to service endpoints with a higher priority value, receiving device B 210 may begin to transmit communication packets to service edge C 208 based on selection of a route with a higher priority for transmitting such packets. As such, service edge C 208 may establish one or more communication tunnels and/or other types of routing with receiving device B 210 to begin receiving communication packets in operation 314. Further, because service edge C 208 has a copy of the session table from service edge B 206, service edge C may process the received communication packets in the same or similar manner as service edge B. In other words, separate communication sessions do not need to be established by service edge C 208 as the pre-existing sessions may continue via service edge C 208 and based on the information in the copied session table. Because each session may continue as established via the session table, interruption to each session may not be experienced by receiving device B 210. Rather, the communication sessions originating from receiving device B 210 may simply be routed via service edge C 208 during the same communication session that was established by service edge B 206. In this manner, seamless migration of the service communications from service edge B 206 to service edge C 208 may occur with minimal interruption to the existing service sessions.

In operation 316, the network 202 or service edge C 208 may determine if traffic from receiving device B 210 is being transmitted to service edge C 208. If traffic or packets are not being transmitted to service edge C 208, the service edge may return to operation 314 and establish one or more communication tunnels with receiving device B 210. In general, the network 202 and/or service edge C 208 may continue to establish communication tunnels until all existing communication sessions included in the session table are routed via service edge C 208 or expire based on an associated timer. Once it is determined that all communications in the session table are routed to service edge C 208, the network 202 and/or service edge C may enable communication alerts and reporting associated with the provided service in operation 318 to complete the migration of providing the service to receiving device B 210 from service edge C 208.

Through the above operations, the network service may be initially migrated from service edge B 206 to service edge C 208. To continue the process of migration and remove the service from availability by service edge B 206, the network 202 may proceed to operation 320 illustrated in FIG. 3B. In this operation, it may be determined if any new communication sessions are instantiated on service edge B 206 from receiving device B 210. Although receiving device B 210 may be configured to route communications to service edge C 208 based on the priority value associated with service edge C as described above, some communications may be established between receiving device B 210 and service edge B 206 during migration or following migration based on other routing rules. A new session may be a session that is not included on the session table provided to service edge C 208 that was instantiated after the session table was shared. If a new communication session has been established, the network 202 may return to operations 310-318 to replicate the new session information to service edge C 208 and establish a communication tunnel for the new session. These operations may continue until no new communication session established at service edge B 206 from receiving device B 210.

If no new sessions are created or detected on service edge B 206, the method may proceed to operation 322 and wait for a time out of existing sessions on service edge B. As described above, each session may be associated with a timer such that information associated with the session may be deleted from the service edge upon expiration of the timer. After expiration of the time out period for the service edge, the network 202 may determine, in operation 324, if any traffic from receiving device B 210 is carried on service edge B 206. If it is determined that traffic from receiving device B 210 is still carried on service edge B 206, the network may clear any remaining sessions associated with receiving device B 210 and service edge B 206 from the session table maintained by service edge B in operation 326. In some instances, the service edge 206 may remove all remaining sessions from the session table with an address or port associated with receiving device B 210. In other instances, the service edge 206 may wait for each remaining session associated with receiving device B 210 to time out or expire. Further, after clearing any remaining sessions or if it is determined that no traffic with receiving device is carried on service edge B 206, the network 202 and/or service edge B 206 may disable alerting and/or reporting for service edge B 206 associated with the service provided to receiving device B 210 in operation 328. Rather, the alerting and reporting aspect of the service may now be performed by service edge C 208, as noted above.

Following removal of all traffic and sessions from service edge B 206, service edge C 208 may be instructed to advertise the service endpoint routes with the same priority value as was advertised from service edge B in operation 330. Extending the above example, service edge C 208 may begin advertising service endpoints route with a priority value of 4, similar to the routes advertised by service edge B 206. However, because service edge B 206 no longer advertises service endpoints to the device, receiving device B 210 selects the routes to service edge C 208 to receive the network service. Thus, migration of providing the service from service edge B 206 to service edge C 208 is complete, with service edge C assuming advertisement of the service endpoints with the same priority value as was previously advertised by service edge B 206. Through the operations described above, the network service provided from service edge B 206 may be migrated to service edge C 208, with minimal interruption to existing services and/or communication sessions associated with the service.

In some instances, services provided to a receiving device may be consolidated from multiple service edges to a single service edge. For example, receiving device B 210 may receive network services, such as a security service, from service edge B 206 and service edge A 204. For any number of reasons, the services provided by service edge A and service edge B may both be migrated to service edge C 208 or another single access point for the network 202. The network service previously provided via two or more service edges 204, 206 may then be provided to the receiving device 210 via a single service edge 208 or access point to the network 202. To migrate another service instance from a service edge, such as service edge A 204, to service edge C 208 after or during service is migrated from service edge B 206 to service edge C, the network 202 or other devices may perform the method 400 illustrated in the flowchart of FIG. 4. In general, the operations of FIG. 4 may be performed for migration of services from a first service edge 204 to a second service edge 208 as part of a consolidation of multiple services to a single service edge. As such, the method 400 may be performed any number of times to consolidate services to the single service edge to configure the network 202 and provide the services to the receiving device 210. The operations of the method 400 may be performed or executed by devices and/or systems of the network 202 or associated with the network discussed above. The operations may be performed by one or more hardware components of said devices, the execution of one or more software instructions, or a combination of both hardware components and software components. In general, any number and type of components of the network 202, including portions or devices of the service edges 204-206, may perform one or more of the operations of the method 400.

Figure 4:
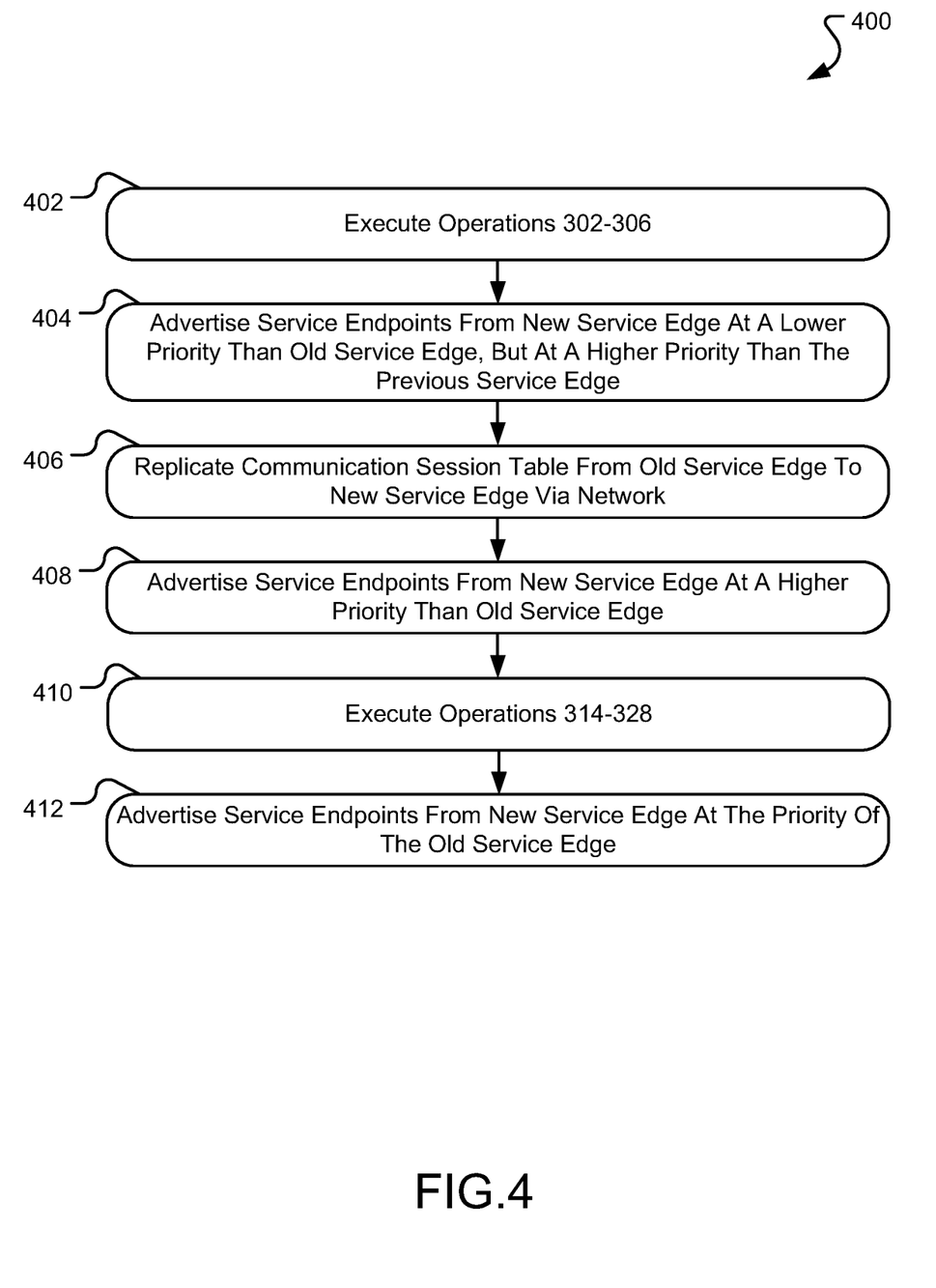
FIG. 4 illustrates a flowchart of a method for migration of network security services from a third device to a second device in accordance with one embodiment.

Several of the operations are similar to that described above with relation to the method 300 of FIGS. 3A and 3B. For example, the network 202 or service edge A 204 may execute operations similar to operations 302-306 in operation 402 to instantiate a basic service on service edge C 208, establish a communication path 214 between service edge A 204 and service edge C 208 via the network 202, and replicate the service image from service edge A to service edge C. Each of these operations may be similar to the corresponding operations described above when migrating service edge B 206 to service edge C 208. In operation 404, service edge C 208 may broadcast service endpoints to receiving device B 210 to provide service routes associated with the service being provided by service edge A 204. In particular and similar to above, the advertised service endpoints or routes may include a priority value that is lower than the announced routes from service edge A 204 such that receiving device B 210 continues to choose the service routes to service edge A. However, the priority value of the advertised service endpoints or routes from service edge C 208 may also be higher than the priority of the routes to service edge B 206. For example, assume that the routes advertised from service edge B 206 have a priority value of 4 and the routes advertised from service edge A 204 have a priority value of 6. To ensure that receiving device B 210 continues to select service edge A 204 to receive the network service, the priority value for the advertised routes from service edge C 208 is lower than the path A routes. However, to be a valid back-up route for the routes to service edge A 204, the routes to service edge C 208 have a higher priority value than the priority value of routes to service edge B 206. Thus, service edge C 208 may advertise routes with a priority value of 5, which is lower priority value than the routes to service edge A 204 but higher than the routes to service edge B 206. This may ensure that receiving device B 210 does not switch over to service edge B 206 upon a failure at service edge A 204, but instead would switch the service routes to service edge C 208.

In operation 406, the network 202 may instruct service edge A 204 to transmit a session table associated with the communications received from receiving device B 210 to service edge C 208, in some instances via direct communication link 214 or other indirect communication links. Service edge C 208 may store the session table and utilize the stored table to determine processing operations for received communications from receiving device B 210, as described above. To begin receiving communications from receiving device B 210 to take over the routing of the packets of the communication sessions, service edge C 208 may advertise, in operation 408, the service endpoint routes with a higher priority value than the priority value advertised by service edge A 204. For example and as mentioned above, a priority level of 6 may be associated with routes advertised or announced by service edge A 204. Thus, service edge C 208 may announce or advertise routes to service endpoints with a higher priority value than those routes of service edge A 204, or greater than 6. In one instance, the priority value for advertised routes may be 7, although any priority value greater than that of the routes announced by service edge A 204 may be used.

In operation 410, the network 202 and/or devices associated with the network may execute operations 314-328, as described above to establish communication tunnels between service edge C 208 and receiving device B 210 and remove receiving device B traffic from service edge A 204. Following removal of all traffic and sessions from service edge A 204, service edge C 208 may be instructed to advertise the service endpoint routes with the same priority value as was advertised from service edge A in operation 412. Extending the above example, service edge C 208 may begin advertising service endpoints route with a priority value of 6, similar to the routes advertised by service edge A 204. However, because service edge A 204 no longer advertises service endpoints to receiving device B 210, receiving device B 210 selects the routes to service edge C 208 to receive the network service. Thus, migration of providing the service from service edge A 204 to service edge C 208 is complete, with service edge C assuming advertisement of the service endpoints with the same priority value as was advertised by service edge A. Through the operations described above, the network service provided from service edge A 204 and service edge B 206 may be migrated to service edge C 208, with minimal interruption to existing services and/or communication sessions associated with the service.

The operations described above may be used to migrate services from any number of services edges to any number of other services edges based on the priority values associated with those service edges. For example, several of the operations may be executed or performed to migrate services from service edge A 204 to both service edge C 208 and service edge B 206. In addition, migration of services between services edges may occur for various priority values. For example, one or more of the operations described above may be performed when the priority value associated with service edge A is equal to the priority value associated with service edge B. In general, any combination of service edges and priority values associated with said services edges may be considered during migration of a service from one edge to another.

Figure 5:
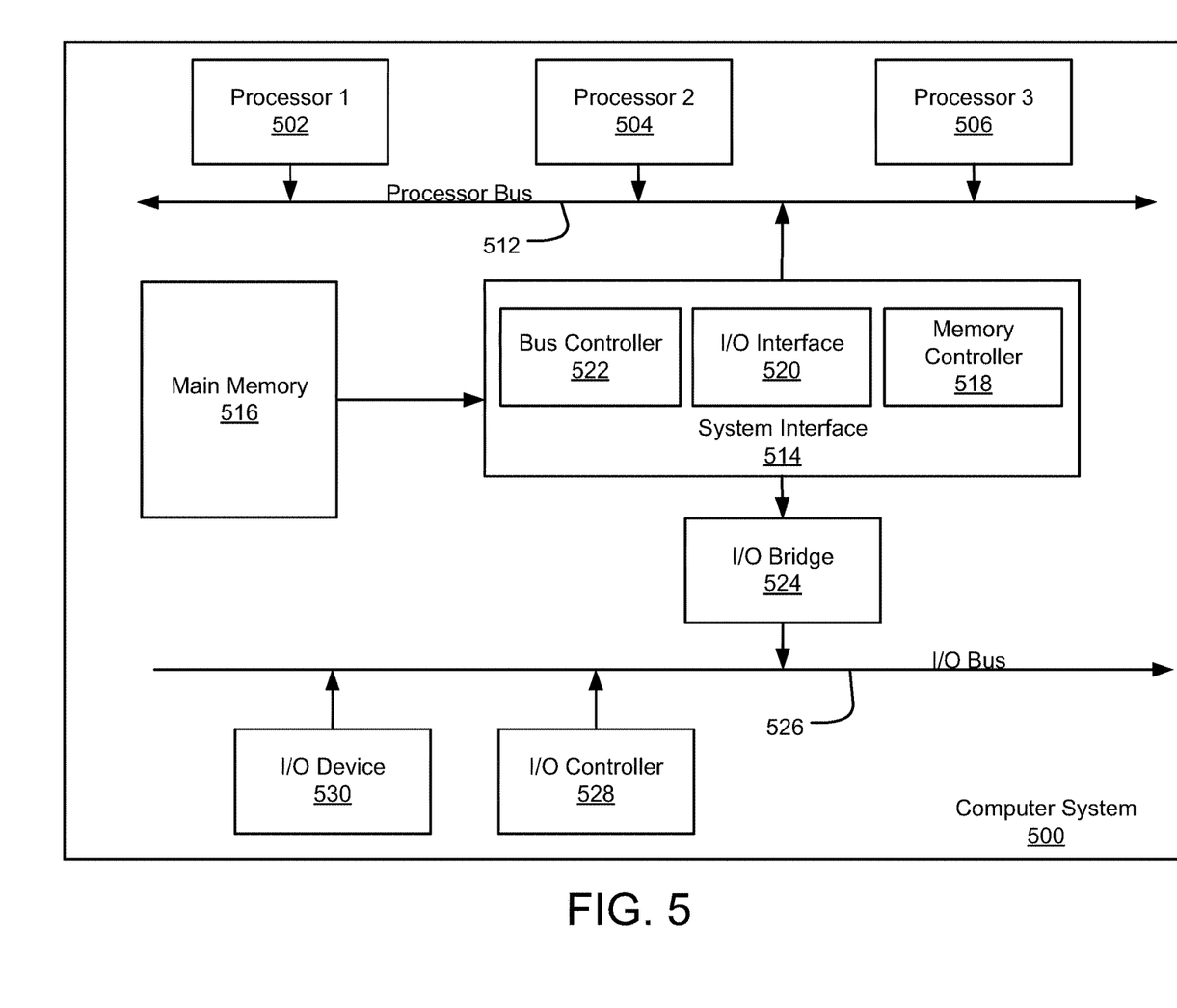
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be a device of a service edge 204-208 and/or the security management system 124 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

Various embodiments of the disclosure are discussed in detail above. While specific implementations are discussed, it should be understood that this is done for illustration purposes only. A person skilled in the relevant art will recognize that other components and configurations may be used without parting from the spirit and scope of the disclosure. Thus, the preceding description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can be references to the same embodiment or any embodiment; and, such references mean at least one of the embodiments. Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Various modifications and additions can be made to the exemplary embodiments discussed without departing from the scope of the description. For example, while the embodiments described above refer to particular features, the scope of this invention also includes embodiments having different combinations of features and embodiments that do not include all of the described features. Accordingly, the scope of the present description is intended to embrace all such alternatives, modifications, and variations together with all equivalents thereof.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

I claim:

1. A method for managing services provided by a telecommunications network, the method comprising:
    receiving, from a first service edge of a network, a session table of the first service edge at a second service edge of the network, the session table comprising communication information between the first service edge and a receiving device in communication with the first service edge, wherein the first service edge advertises a first service communication path comprising a first priority value;
    establishing a security service from the first service edge at the second service edge, the security service associated with the communication information of the session table;
    responsive to establishing the security service at the second service edge, providing the security service to the receiving device from the second service edge;
    advertising a second service communication path from the second service edge, the second service communication path comprising a second priority value lower than the first priority value;
    removing, after establishing the security service from the first service edge to the second service edge, the session table from the first service edge; and
    advertising, the second service communication path comprising a third priority value the same as the first priority value.

2. The method of claim 1 further comprising:
    receiving a request from a device of a secondary network in communication with the first service edge, wherein receiving the session table at the second service edge comprises copying the session table at the second service edge in response to the request.

3. The method of claim 1 further comprising:
    receiving a request for service migration based on an operational condition of a service network, wherein receiving the session table at the second service edge comprises copying the session table at the second service edge in response to the request.

4. The method of claim 1, wherein establishing the security service from the first service edge at the second service edge comprises:
    instantiating an initial instance of the security service at the second service edge; and
    copying a service image from the first service edge to the initial instance of the security service.

5. The method of claim 1 wherein advertising the second service communication path comprising the second priority value causes migration of communications from the receiving device to the second service edge.

6. The method of claim 1 further comprising:
    advertising, after copying of the session table, the second service communication path comprising a fourth priority value higher than the first priority value.

7. The method of claim 1 further comprising:
    migrating the security service from a third service edge to the second service edge, the receiving device in communication with the third service edge and the second service edge.

8. The method of claim 1, wherein the communication information of the session table comprises at least one of a source address, a destination address, a source port identifier, a destination port identifier, or a service port identifier.

9. A device comprising:
    a processing device; and
    a non-transitory computer-readable medium encoded with instructions, which when executed by the processing device, cause the processing device to:
        receive, from a first serve edge of a service network, copy a session table of the first service edge at a second service edge of the service network, the session table comprising communication information between the first service edge and a receiving device connected to the first service edge, wherein the first service edge advertises a first service communication path comprising a first priority value;
        migrate an instance of a security service from the first service edge to the second service edge, the security service associated with the communication information of the session table;
        responsive to the migration of the instance of the security service, provide a security feature to the receiving device from the second service edge;
        advertise a second service communication path from the second service edge, the second service communication path comprising a second priority value lower than the first priority value;
        remove, after establishing the security service from the first service edge to the second service edge, the session table from the first service edge; and
        advertise, the second service communication path comprising a third priority value the same as the first priority value.

10. The device of claim 9 further comprising:
    a communication port for receiving a request to migrate the security service from the first service edge to the second service edge, wherein receiving the session table at the second service edge is in response to receiving the request.

11. The device of claim 10, wherein the request is based on an operating condition of first service edge and the second service edge.

12. The device of claim 11, wherein the operating condition is a measured flow of communication packets of the first service edge and the second service edge.

13. The device of claim 9, wherein the instructions further cause the processing device to:
    establish, via the service network, a communication tunnel between the first service edge and the second service edge, wherein receiving the session table comprises transmitting the session table over the communication tunnel.

14. The device of claim 9, wherein the instructions further cause the processing device to:
    instantiate an initial instance of the security service at the second service edge; and
    copy a service image from the first service edge to the initial instance of the security service.

15. The device of claim 9 wherein advertising the second service communication path comprising the second priority value causes migration of communications from the receiving device to the second service edge.

16. The device of claim 9 wherein the instructions further cause the processing device to:
    advertise, after receiving of the session table, the second service communication path comprising a fourth priority value higher than the first priority value.

* * * * *